US008832233B1

(12) United States Patent
Brin et al.

(10) Patent No.: US 8,832,233 B1
(45) Date of Patent: Sep. 9, 2014

(54) EXPERIENCE SHARING FOR CONVEYING COMMUNICATION STATUS

(75) Inventors: Sergey Brin, Palo Alto, CA (US); Steven John Lee, San Francisco, CA (US); Indika Charles Mendis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 102 days.

(21) Appl. No.: 13/314,179

(22) Filed: Dec. 8, 2011

Related U.S. Application Data

(60) Provisional application No. 61/510,020, filed on Jul. 20, 2011.

(51) Int. Cl.
*G06F 15/16* (2006.01)

(52) U.S. Cl.
USPC ............ 709/219; 709/203; 709/204; 709/227

(58) Field of Classification Search
USPC .................................. 709/219, 203, 204, 227
See application file for complete search history.

(56) References Cited

U.S. PATENT DOCUMENTS

| 7,546,352 | B1 | 6/2009 | Bhattiprolu et al. | |
|---|---|---|---|---|
| 7,683,937 | B1 | 3/2010 | Blumenfeld | |
| 7,711,961 | B2 | 5/2010 | Fujinuma et al. | |
| 7,742,184 | B2 | 6/2010 | Seki et al. | |
| 2005/0138560 | A1* | 6/2005 | Lee et al. ...................... | 715/719 |
| 2005/0266884 | A1 | 12/2005 | Marriott et al. | |
| 2006/0132382 | A1 | 6/2006 | Jannard | |
| 2007/0060193 | A1* | 3/2007 | Kim ........................... | 455/550.1 |
| 2008/0023002 | A1 | 1/2008 | Guelzow et al. | |
| 2008/0037574 | A1* | 2/2008 | Huh et al. ...................... | 370/416 |
| 2008/0103877 | A1 | 5/2008 | Gerken | |
| 2008/0134235 | A1 | 6/2008 | Kalaboukis | |
| 2008/0270541 | A1* | 10/2008 | Keener et al. ................. | 709/206 |
| 2009/0013263 | A1* | 1/2009 | Fortnow et al. ............... | 715/753 |
| 2009/0157816 | A1* | 6/2009 | Pattan ........................... | 709/206 |
| 2009/0215477 | A1* | 8/2009 | Lee et al. ...................... | 455/466 |
| 2009/0219166 | A1 | 9/2009 | MacFarlane et al. | |
| 2010/0020229 | A1 | 1/2010 | Hershey et al. | |
| 2010/0082759 | A1 | 4/2010 | Nalliah et al. | |

(Continued)

FOREIGN PATENT DOCUMENTS

| WO | 2009052618 | 4/2009 |
|---|---|---|
| WO | 2010007612 | 1/2010 |

OTHER PUBLICATIONS

Chris Obenschain. "How Ustream Works." May 2, 2010. <http://web.archive.org/web/20100502111343/http://computer.howstuffworks.com/internet/social-networking/networks/ustream.htm/printable>.*

(Continued)

*Primary Examiner* — Jude Jean Gilles
*Assistant Examiner* — Johnny Aguiar
(74) *Attorney, Agent, or Firm* — McDonnell Boehnen Hulbert & Berghoff LLP

(57) ABSTRACT

Exemplary methods and systems relate to the handling of a communication request by a wearable computing device. For example, a wearable computing device may respond to communication requests by sharing real-time media that portrays the device's surroundings and the activity of a user associated with the device. The wearable device or a server system communicatively linked to the wearable device may perform the reception and transmission functions. This process may proceed automatically or as a result of user-input and may additionally involve procedures for accepting or rejecting the communication request.

17 Claims, 6 Drawing Sheets

(56) References Cited

U.S. PATENT DOCUMENTS

| | | | |
|---|---|---|---|
| 2010/0125531 A1 | 5/2010 | Wong | |
| 2010/0157013 A1* | 6/2010 | Sylvain | 348/14.01 |
| 2010/0161635 A1 | 6/2010 | Dey | |
| 2010/0199340 A1 | 8/2010 | Jonas et al. | |
| 2011/0035453 A1* | 2/2011 | Koul et al. | 709/206 |
| 2011/0055046 A1 | 3/2011 | Bowen et al. | |
| 2011/0096168 A1* | 4/2011 | Siann et al. | 348/158 |
| 2011/0107220 A1 | 5/2011 | Perlman | |
| 2011/0140913 A1 | 6/2011 | Montenero | |
| 2011/0221657 A1* | 9/2011 | Haddick et al. | 345/8 |
| 2011/0246421 A1 | 10/2011 | Takahashi | |
| 2012/0056972 A1* | 3/2012 | Benedeki et al. | 348/14.03 |
| 2012/0166453 A1 | 6/2012 | Broder | |
| 2012/0182384 A1* | 7/2012 | Anderson et al. | 348/14.09 |
| 2012/0320013 A1* | 12/2012 | Perez et al. | 345/207 |

OTHER PUBLICATIONS

"Ustream.tv" Jul. 15, 2010. <http://web.archive.org/web/20100715192635/http://www.ustream.tv/>.*

Martin, Reed, et al., neXtream: A Multi-Device, Social Approach to Video Content Consumption, MIT Media Lab, IEEE, 2010.

Cesar, Pablo, Enhancing Social Sharing of Videos: Fragment, Annotate, Enrich, and Share, ACM, Oct. 2008.

Wikimedia Foundation Inc., Ustream, Nov. 17, 2011 available online at http://en_wikipedia_org/wiki/Ustream (last visited Dec. 6, 2011).

Heater, Brian, Color for Facebook iPhone App Hands-On, available online at http://www_engadget_com/2011/12/01/color-for-facebook-iphone-app-hands-on/ (last visited Dec. 6, 2011).

* cited by examiner

EXPERIENCE SHARING FOR CONVEYING COMMUNICATION STATUS

CROSS REFERENCE TO RELATED APPLICATIONS

This application claims priority to U.S. Patent App. No. 61/510,020, filed Jul. 20, 2011, entitled "Experience Sharing", now pending, the contents of which are incorporated by reference herein for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary method involves a server system establishing an experience-sharing session with a sharing device, in which the server receives shared media (e.g., video, audio, text, graphics, photographs, etc.) from the sharing device and transmits this shared media to a client device in response to receiving a communication request from the client device. The shared media may be used to convey the communication status of a user associated with the sharing device by including media from the user's surroundings and the user's interactions with their surroundings. The requested communication may include various arrangements of real-time video, real-time audio, and/or text. Further, one or more communication applications may be utilized to carry out the communication request process. Additionally, an exemplary method may include procedures for confirming, accepting, and/or rejecting the communication request.

In another aspect, an exemplary sharing device may include a non-transitory computer-readable medium in which program instructions are stored. These instructions may be executable by a processor to establish and experience-sharing session, receive communication requests from client devices and responsively transmit media to the client devices in real-time. In an exemplary embodiment, the transmitted media may convey the communication status of a user associated with the sharing device by including captured video, audio and other media from the user's surroundings. The sharing device may include the means for capturing this media. Further, the transmission may occur automatically or by user-input and the requested communication may include various forms of audio, text, and/or video communication.

In another aspect, an exemplary method may involve a sharing device establishing an experience-sharing session that includes receiving and transmitting a portion of a real-time video feed to a client device in response to receiving a communication request from the client device. This real-time video feed may be captured by one or more outward-facing cameras and the transmitted portion may be a low-resolution version of the video feed.

These as well as other aspects, advantages, and alternatives, will become apparent to those of ordinary skill in the art by reading the following detailed description, with reference where appropriate to the accompanying drawings.

DETAILED DESCRIPTION

Figure 1:
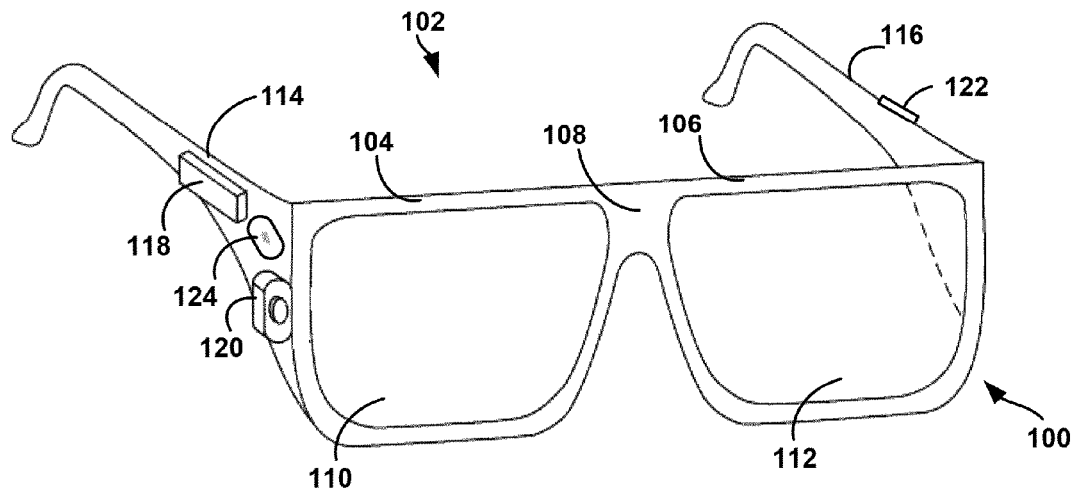
FIG. 1 illustrates an example sharing device.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

In an exemplary embodiment, an experience-sharing session may be established via a wearable-computing device to automatically convey a wearer's availability for communications. For example, a user may be in a business meeting and the shared media may therefore depict that the user will be distracted from their meeting by the requested communication. A client device requesting communication with the wearer may thus receive a portion of a point-of-view video feed, which may effectively communicate that the user is in a business meeting and unavailable, without requiring that the user of the wearable device step away from the meeting to relay this message. Many other examples are possible as well.

1. Overview

A wearable computing device may be configured receive communication requests (e.g., phone calls, instant messages, etc.) from client devices and, in response, share media depicting the communication status of the wearable computing device's user with the client device. Therefore, a wearer of such a device may capture media that conveys the world as they are experiencing it, and then transmit this media to others in order to share their experience. For example, an experience-sharing session (ESS) may include a user sharing a point-of-view video feed captured by a head-mounted video camera on their wearable computer, along with a real-time audio feed from a microphone of their wearable computer.

In an ESS, the computing device that is sharing a user's experience may be referred to as a "sharing device" or a "sharer," while the computing device or devices that are receiving real-time media from the sharer may each be referred to as a "viewing device" or a "viewer." Additionally, the content that is shared by the sharing device during an ESS may be referred to as a "share." Further, a computing system that supports an ESS between a sharer and one or more viewers may be referred to as a "server", an "ES server," "server system," or "supporting server system."

A share may include a single type of media content (i.e., a single modality of media), or may include multiple types of media content (i.e., multiple modalities of media). In either case, a share may include a video feed, a three-dimensional (3D) video feed (e.g., video created by two cameras that is combined to create 3D video), an audio feed, a text-based feed, an application-generated feed, and/or other types of media content. Some or all of the media content may be transmitted in real-time, so that the shared experience is sufficiently recent to depict a user's current status. In this case, "real-time" refers to the fact that the shared media is transmitted as it is being captured. However, it should be understood that there may be some delay time between capture and receptions of a share due to the systems, techniques, and user-preferences used in capturing, processing, transmitting, and receiving the share.

Further, in some embodiments a share may include multiple feeds of the same type of media content. For example, in some embodiments, a share may include two or more video feeds. For instance, a share could include a first video feed from a forward-facing camera on a head-mounted display (HMD), and a second video feed from a camera on the HMD that is facing inward towards the wearer's face. As another example, a share could include multiple audio feeds for stereo audio or spatially-localized audio providing surround sound.

2. Exemplary Device Architecture

FIG. 1 illustrates an example system 100 for receiving, transmitting, and displaying data. The system 100 is shown in the form of a wearable computing device. While FIG. 1 illustrates a head-mounted device 102 as an example of a wearable computing device, other types of wearable computing devices could additionally or alternatively be used. As illustrated in FIG. 1, the head-mounted device 102 comprises frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be wire- or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the system 100.

Further, although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 2:
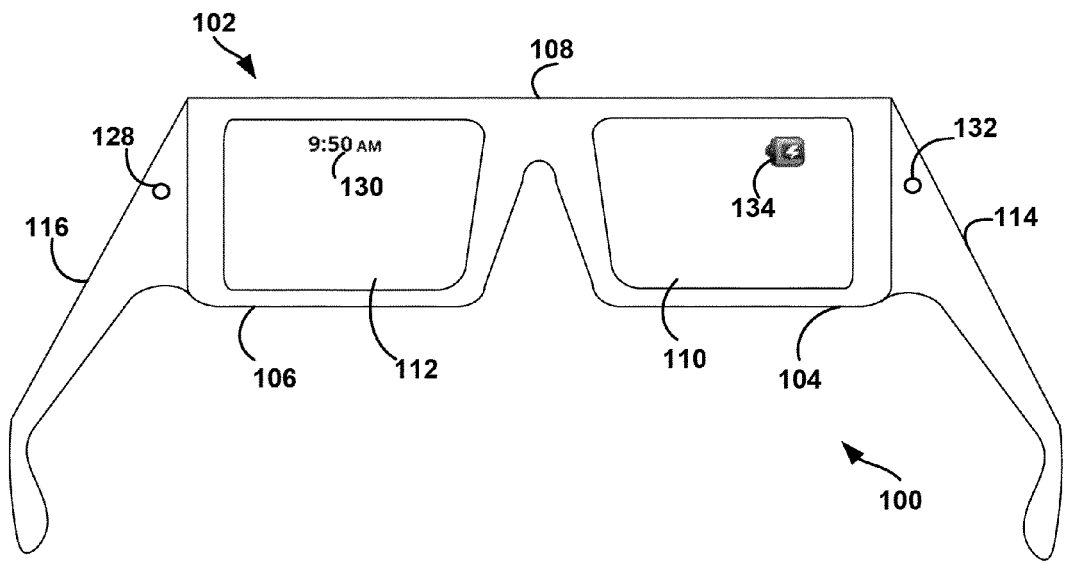
FIG. 2 illustrates an alternate view of the system illustrated in FIG. 1A.

FIG. 2 illustrates an alternate view of the system 100 illustrated in FIG. 1. As shown in FIG. 2, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 3A:
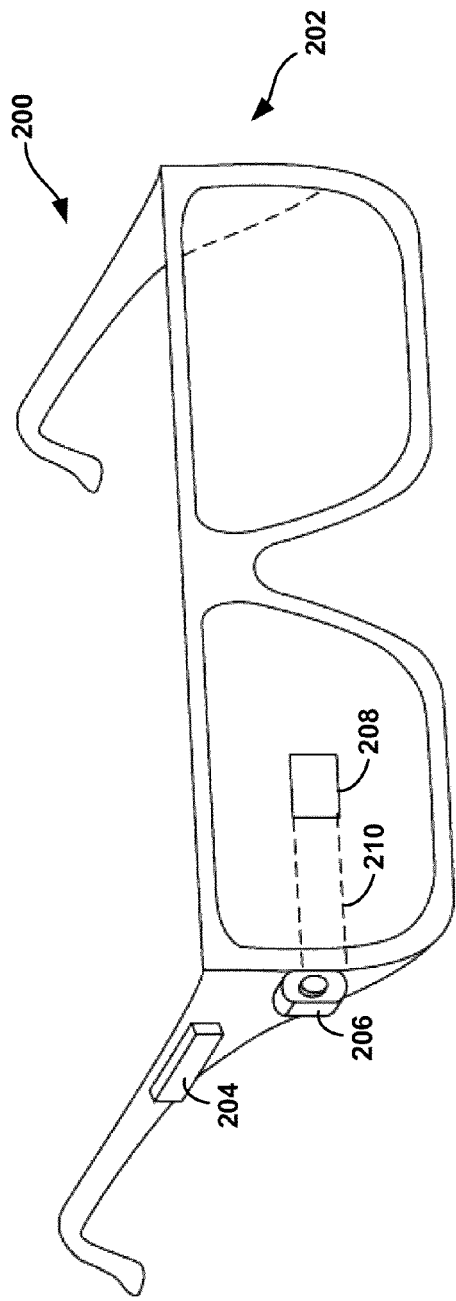
FIG. 3A illustrates an example sharing device.

FIG. 3A illustrates an example system 200 for receiving, transmitting, and displaying data. The system 200 is shown in the form of a wearable computing device 202. The wearable computing device 202 may include frame elements and side-arms such as those described with respect to FIGS. 1 and 2. The wearable computing device 202 may additionally include an on-board computing system 204 and a video camera 206, such as those described with respect to FIGS. 1 and 2. The video camera 206 is shown mounted on a frame of the wearable computing device 202; however, the video camera 206 may be mounted at other positions as well.

As shown in FIG. 3A, the wearable computing device 202 may include a single display 208 which may be coupled to the device. The display 208 may be formed on one of the lens elements of the wearable computing device 202, such as a lens element described with respect to FIGS. 1 and 2, and may be configured to overlay computer-generated graphics in the user's view of the physical world. The display 208 is shown to be provided in a center of a lens of the wearable computing device 202; however, the display 208 may be provided in other positions. The display 208 is controllable via the computing system 204 that is coupled to the display 208 via an optical waveguide 210.

Figure 3B:
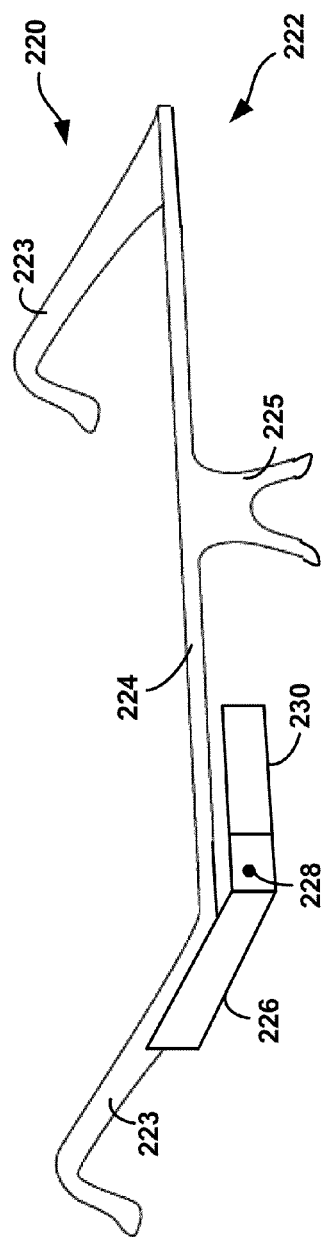
FIG. 3B illustrates an example sharing device.

FIG. 3B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 3B, the center frame support 224 connects the side-arms 223. The wearable computing device 222 does not include lens-frames containing lens elements. The wearable computing device 222 may additionally include an on-board computing system 226 and a video camera 228, such as those described with respect to FIGS. 1 and 2.

The wearable computing device 222 may include a single lens element 230 that may be coupled to one of the side-arms 223 or the center frame support 224. The lens element 230 may include a display such as the display described with reference to FIGS. 1 and 2, and may be configured to overlay computer-generated graphics upon the user's view of the physical world. In one example, the single lens element 230 may be coupled to the inner side (i.e., the side exposed to a portion of a user's head when worn by the user) of the extending side-arm 223. The single lens element 230 may be positioned in front of or proximate to a user's eye when the wearable computing device 222 is worn by a user. For example, the single lens element 230 may be positioned below the center frame support 224, as shown in FIG. 3B.

Any of the above-described exemplary embodiments may additionally include audio devices, including one or more speakers and/or one or more microphones. Audio devices may be integral to the wearable computer or externally connected through a physical wired connection or a wireless radio connection.

3. Exemplary Server Architecture

Figure 4A:
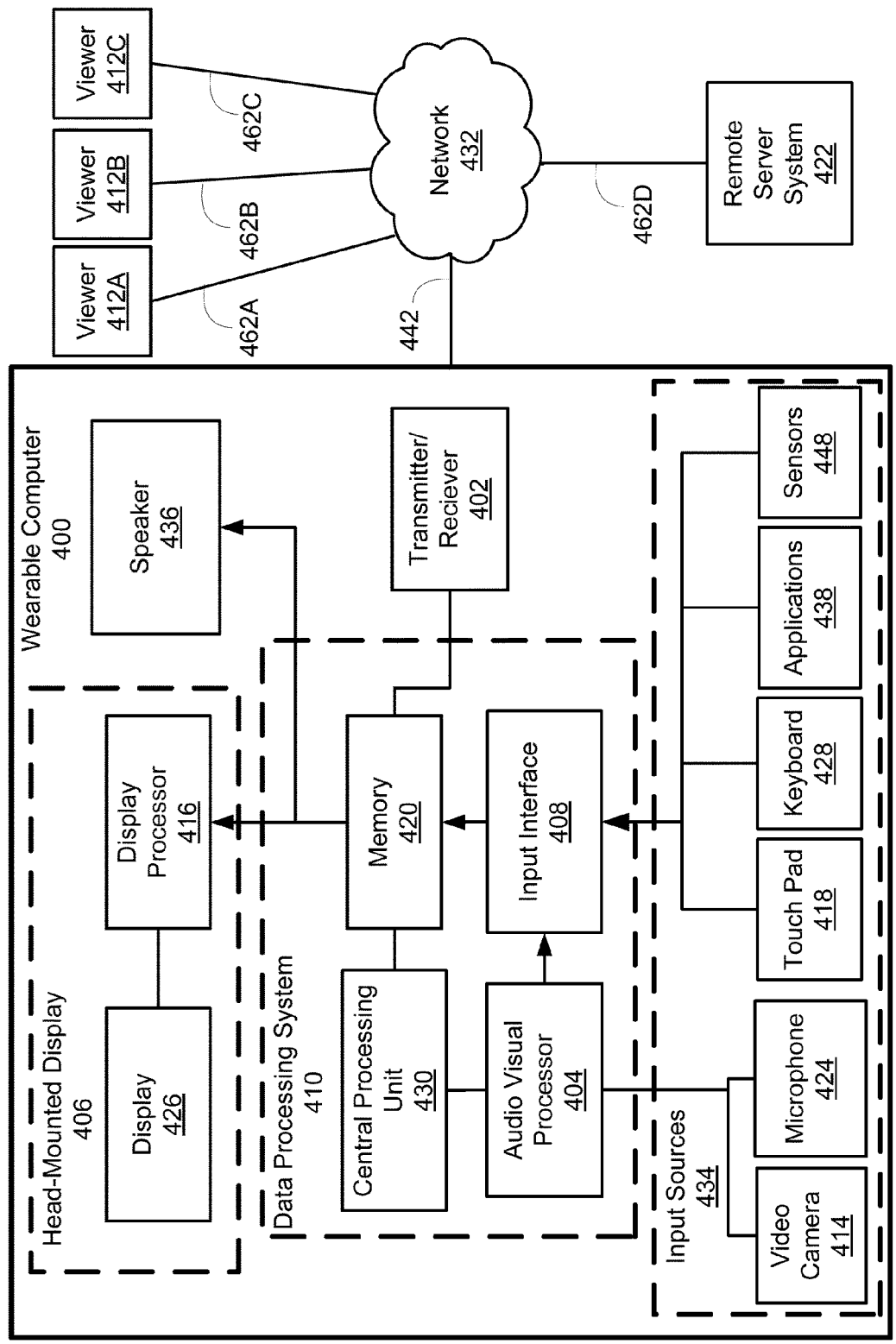
FIG. 4A shows a simplified block diagram of an example experience sharing system architecture.

FIG. 4A is a simplified diagram of a sharing device, according to an exemplary embodiment. In particular, FIG. 4A shows a wearable computer 400, configured to serve as the sharer in an ESS. It should be understood, however, that other types of computing devices may be configured to provide similar sharing-device functions and/or may include similar components as those described in reference to wearable computer 400, without departing from the scope of the invention.

As shown, wearable computer 400 includes a head-mounted display (HMD) 406, several input sources 434, a data processing system 410, and a transmitter/receiver 402. FIG. 4A also indicates that a communicative link 442 may be established between the wearable computer 400 and a network. Further, the network may connect to a server 422 and one or more viewers 412A, 412B, and 412C through additional connections 462D, 462A, 462B, and 462C.

An exemplary set of input sources 434 are shown in FIG. 4A as features of the wearable computer including a video camera 414, a microphone 424, a touch pad 418, a keyboard 428, one or more applications 438, and other general sensors 448 (e.g. biometric sensors). The input sources 434 may be internal, as shown in FIG. 4A, or the input sources 434 may be in part or entirely external. Additionally, the input sources 434 shown in FIG. 4A should not be considered exhaustive, necessary, or inseparable. Exemplary embodiments may exclude any of the exemplary set of input devices 434 and/or include one or more additional input devices that may add to an ESS.

The exemplary data processing system 410 may include a memory system 420, a central processing unit (CPU) 430, an input interface 408, and an audio visual (A/V) processor 404. The memory system 420 may be configured to receive data from the input sources 434 and/or the transmitter/receiver 402. The memory system 420 may also be configured to store received data and then distribute the received data to the CPU 430, the HMD 406, a set of one or more speakers 436, or to a remote device through the transmitter/receiver 402.

The CPU 430 may be configured to detect a stream of data in the memory system 420 and control how the memory system distributes the stream of data. The input interface 408 may be configured to process a stream of data from the input sources 434 and then transmit the processed stream of data into the memory system 420. This processing of the stream of data converts a raw signal, coming directly from the input sources 434 or A/V processor 404, into a stream of data that other elements in the wearable computer 400, the viewers 412, and the server 422 can use. The A/V processor 404 may be configured perform audio and visual processing on one or more audio feeds from one or more microphones 424 and on one or more video feeds from one or more video cameras 414. The CPU 430 may be configured to control the audio and visual processing performed on the one or more audio feeds and the one or more video feeds. Examples of audio and video processing techniques, which may be performed by the A/V processor 404, will be given later.

The transmitter/receiver 402 may be configured to communicate with one or more remote devices through the communication network 432. Each connection made to the network (442, 462A, 462B, 462C, and 462D) may be configured to support two-way communication and may be wired or wireless.

The HMD 406 may be configured to display visual objects derived from many types of visual multimedia, including video, text, graphics, pictures, application interfaces, and animations. In some embodiments, one or more speakers 436 may also present audio objects. Some embodiments of an HMD 406 may include a visual processor 416 to store and transmit a visual object to a physical display 426, which actually presents the visual object. The visual processor 416 may also edit the visual object for a variety of purposes. One purpose for editing a visual object may be to synchronize displaying of the visual object with presentation of an audio object to the one or more speakers 436. Another purpose for editing a visual object may be to compress the visual object to reduce load on the display. Still another purpose for editing a visual object may be to correlate displaying of the visual object with other visual objects currently displayed by the HMD 406.

While FIG. 4A illustrates a wearable computer configured to act as sharing device, it should be understood that a sharing device may take other forms. For example, a sharing device may be a mobile phone, a tablet computer, a personal computer, or any other computing device configured to provide the sharing device functionality described herein.

In general, it should be understood that any computing system or device described herein may include or have access to memory or data storage, which may take include a non-transitory computer-readable medium having program instructions stored thereon. Additionally, any computing system or device described herein may include or have access to one or more processors. As such, the program instructions stored on such a non-transitory computer-readable medium may be executable by at least one processor to carry out the functionality described herein. Further, while not discussed in detail, it should be understood that the components of a computing device that serves as a viewing device in an ESS may be similar to those of a computing device that serves as a sharing device in an ESS. Further, a viewing device may take the form of any type of networked device capable of providing a media experience (e.g., audio and/or video), such as television, a game console, and/or a home theater system, among others.

4. Cloud-Based Experience Sharing

In some exemplary embodiments a remote server may help reduce the sharer's processing load. In such embodiments, the sharing device may send the share to a remote, cloud-based serving system, which may function to distribute the share to the appropriate viewing devices. As part of a cloud-based implementation, the sharer may communicate with the server through a wireless connection, through a wired connection, or through a network of wireless and/or wired connections. The server may likewise communicate with the one or more viewers through wireless and/or wired connections. The server may then receive, process, store, and/or transmit both the share from the sharer and comments from the viewers.

An experience-sharing server may process a share in various ways before sending the share to a given viewer. For example, the server may format media components of a share to help adjust for a particular viewer's needs or preferences. For instance, consider a viewer that is participating in an ESS via a website that uses a specific video format. As such, when the share includes a video, the experience-sharing server may format the video in the specific video format used by the website before transmitting the video to this viewer. In another example, if a viewer is a PDA that can only play audio feeds in a specific audio format, the server may format an audio portion of a share in the specific audio format used by the PDA before transmitting the audio portion to this viewer. Other examples of formatting a share (or a portion of a share) for a given viewer are also possible. Further, in some instances, the ES server may format the same share in a different manner for different viewers in the same ESS.

Further, in some instances, an experience-sharing server may compress a share or a portion of a share before transmitting the share to a viewer. For instance, if a server receives a high-resolution share, it may be advantageous for the server to compress the share before transmitting it to the one or more viewers. For example, if a connection between a server and a certain viewer runs too slowly for real-time transmission of the high-resolution share, the server may temporally or spatially compress the share and send the compressed share to the viewer. As another example, if a viewer requires a slower frame rate for video feeds, a server may temporally compress a share by removing extra frames before transmitting the share to that viewer. And as another example, the server may be configured to save bandwidth by down-sampling a video before sending the stream to a viewer that can only handle a low-resolution image. Additionally or alternatively, the server may be configured to perform pre-processing on the video itself, e.g., by combining multiple video sources into a single feed, or by performing near-real-time transcription (closed captions) and/or translation.

Yet further, an experiencing-sharing server may decompress a share, which may help to enhance the quality of an ESS. In some embodiments, to reduce transmission load on the connection between a sharer and a server, the sharer may compress a share before sending the share to the server. If transmission load is less of a concern for the connection between the server and one or more viewers, the server may decompress the share before sending it to the one or more viewers. For example, if a sharer uses a lossy spatial compression algorithm to compress a share before transmitting the share to a server, the server may apply a super-resolution algorithm (an algorithm which estimates sub-pixel motion, increasing the perceived spatial resolution of an image) to decompress the share before transmitting the share to the one or more viewers. In another implementation, the sharer may use a lossless data compression algorithm to compress a share before transmission to the server, and the server may apply a corresponding lossless decompression algorithm to the share so that the share may be usable by the viewer.

5. Exemplary Experience-Sharing Methods

An experience-sharing session may be initiated by one of several initiation techniques. For example, a sharer, a viewer, or an automated process may initiate an experience-sharing session. An experience-sharing session may be initiated in other ways as well.

The number and/or type of viewers in an experience-sharing session may vary according to the "session mode" of an experience-sharing session. Some exemplary session modes include: (a) a one-to-one mode, in which a single remote viewer receives a share; (b) a one-to-many mode, in which a group of remote viewers receive the share; and (c) a broadcast mode, in which the share is broadcast to a website (such as YouTube) where it can be viewed by anyone who is able to access the website. Further, in some embodiments, an experience-sharing session may involve a many-to-broadcast mode, or in other words, a particular group of participants acting as broadcast-mode sharers to broadcast their collective experience. Note that an example of a many-to-broadcast mode experience-sharing session is provided by the above example where all the members of a football team are sharers in an experience-sharing session. Other examples are also possible. Further, other session modes are also possible.

Figure 4B:
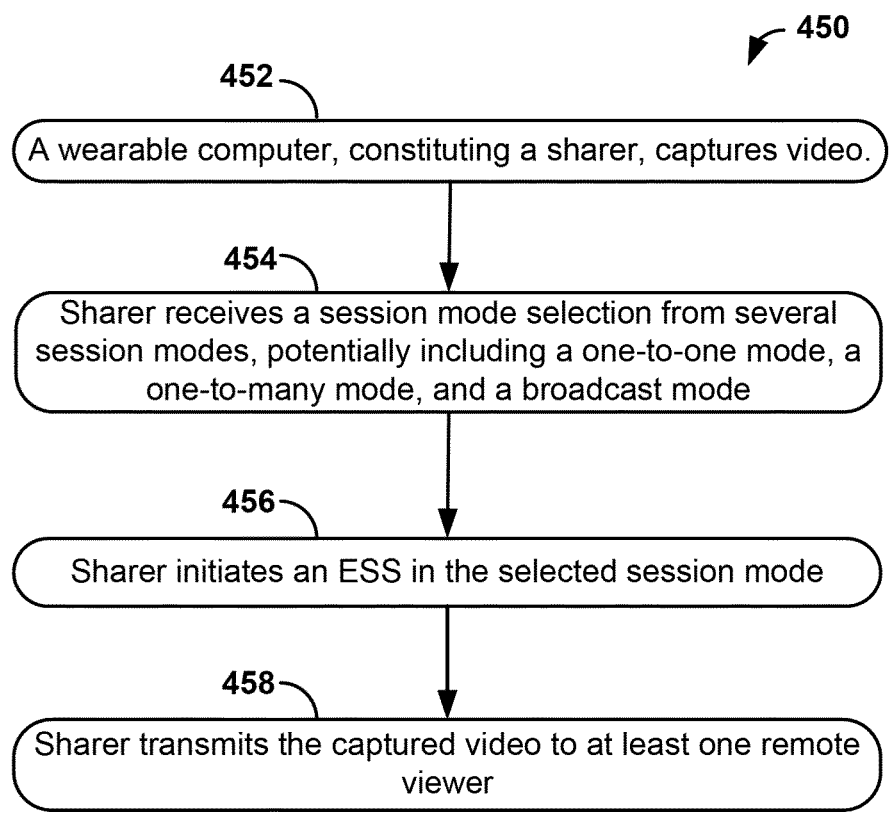
FIG. 4B is a flow chart illustrating an initiation method for an experience-sharing session, according to an exemplary embodiment.

FIG. 4B is a flow chart illustrating an initiation method for an experience-sharing session, according to an exemplary embodiment. The initiation method 450 may involve a sharer, such as a wearable computer, capturing a video, as shown by block 452. Further, this sharer may receive a session mode, selected from several session modes, including a one-to-one mode, a one-to-many mode, and a broadcast mode, as shown by block 454. Next, the sharer may initiate an experience-sharing session in the selected session mode, as shown by block 456. Then, the sharer may transmit the captured video to at least one remote viewer, as shown by block 458.

In a further aspect, when an experience-sharing session is initiated, a sharer may place restrictions on which viewers can join and/or participate in the experience-sharing session. For example, a sharer may enforce copyright restrictions on the content in the share. In this case, viewers must conform to distribution restrictions pertaining to the copyrighted material when accessing the share. As a further example, a sharer may only share a particular experience with geographically-nearby viewers. Another sharer may only invite viewers associated with users in a corresponding social network. Other types of restrictions are also possible. Further, such restrictions may be placed on an experience-sharing session in scenarios other than during initiation of the experience-sharing session.

In another aspect, the manner in which an experience-sharing session is initiated, and/or what device(s) and/or system(s) are involved in the initiation of an experience-sharing session, may depend on the desired type of experience-sharing session, and possibly other factors as well.

Exemplary initiation procedures will now be described in reference to various session modes, and in particular, to a one-to-one session mode, to a one-to-many session mode, and to a broadcast session mode.

i. One-to-One Session Mode

As stated above, a sharer may initiate a one-to-one experience-sharing session between the sharer and a single viewer. A one-to-one experience-sharing session may be initiated in several ways.

For example, a sharer may initiate a one-to-one experience-sharing session by sending out an invitation to a particular user. Upon receiving an acceptance of the invitation from a viewer associated with the particular user, the sharer may begin a one-to-one experience-sharing session with the viewer.

As another example, a sharer may initiate a one-to-one experience-sharing session and by specifying that only one viewer should be allowed to join the experience-sharing session at a time (without identifying the specific user or viewer that can join). As such, the sharer may set specific criteria to limit the identity of viewers that are allowed to join the one-to-one experience-sharing session, and then accept a viewer that meets the criteria on a first-come first-serve basis. Criteria for the viewer in a one-to-one session may include geographic, demographic, contextual, social-network based, or other user-defined viewer criteria. A viewer may join the experience-sharing session if the viewer meets the criteria set by the sharer and if another viewer is not already viewing the experience-sharing session. As an alternative to pre-setting viewer criteria, the sharer may manually accept viewers by receiving a request from a prospective viewer, presenting the request, and receiving instructions to allow or deny the request.

As yet another example, a sharer may initiate a one-to-one experience-sharing session by sending out an invitation to a viewer, receiving an acceptance of the invitation, and then beginning an experience-sharing session with an assigned session mode of one-to-one. The invitation and the acceptance of the invitation may be in a form which best suits the device type of the viewer. Hence, the invitation may be an e-mail, VoIP message, a micro-blog post, or video conference request if the viewer is a desktop computer, while the invitation may be a voice call, video chat, or text message if the viewer is a cell phone. Many other invitation types may be used depending on the device type of the viewer and/or the preferences set on the sharer.

Alternatively, a prospective viewer may initiate a one-to-one experience-sharing session by sending a prospective sharer a request to initiate an experience-sharing session. Upon receiving acceptance of the invitation, the sharer may begin a one-to-one experience-sharing session with the viewer. As in a sharer-initiated one-to-one experience-sharing session, the invitation in a viewer-initiated one-to-one experience-sharing session may take different forms depending on the device type of the viewer. The sharer may also present the invitation in a variety of ways, which may include displaying of text, pictures and/or graphics; playing a voice message or audio alert; and/or invoking a physical alert (e.g.

vibration). The input to accept the invitation may include audio commands received by a microphone or physical sensing from a touchpad, button, actuator, or switch. Alternatively, a sharer may allow a user to prescribe and modify settings to automatically accept or decline experience-sharing session invitations from all or selected prospective viewers.

Another exemplary technique may involve a prospective sharer or a prospective viewer initiating a one-to-one experience-sharing session while engaged in a different form of communication with the other. To elaborate, if a sharer and a viewer (or in a remote implementation: a server and a viewer) each host a communication application, and the communication applications are compatible, an invitation to initiate a one-to-one experience-sharing session may be sent while the viewer and the sharer are already communicatively linked through the communication application. If a prospective sharer sends the invitation, the communication application hosted by the prospective sharer may then receive an acceptance of the invitation and respond to the acceptance of the invitation by initiating a one-to-one experience-sharing session with the viewer. If the prospective viewer sends the invitation within the communication application, the communication application hosted by the prospective sharer may then present the invitation, receive an acceptance of the invitation, and respond to the acceptance of the invitation by initiating a one-to-one experience-sharing session with the viewer.

ii. One-to-Many Session Mode

As indicated previously, a sharer may initiate a one-to-many experience-sharing session between the sharer and one or more viewers. A one-to-many experience-sharing session may be initiated by any of several initiation techniques. Once initiated, the sharer may provide for a viewer or set of viewers to join or leave the one-to-many experience-sharing session.

For example, a sharer may initiate an experience-sharing session and assign the experience-sharing session a session mode of one-to-many, optionally including a maximum allowed number of viewers. Further, the sharer may set specific criteria to limit the identity of viewers that are allowed to join the one-to-many experience-sharing session. Criteria may include geographic, demographic, contextual, social-network based, or other user-defined viewer criteria. A viewer may join the experience-sharing session if the viewer meets the criteria set by the sharer and if the allowed maximum number of viewers has not been reached. As an alternative to pre-setting viewer criteria, the sharer may manually accept viewers by receiving a request from a prospective viewer, presenting the request to a user, and receiving instructions to allow or deny the request.

In another exemplary initiation procedure, a sharer may initiate a one-to-many experience-sharing session by sending out invitations to a set of prospective viewers, receiving at least one acceptance of the invitation, and then beginning an experience-sharing session with an assigned session mode of one-to-many. The invitation and the acceptance of the invitation may be in a form which best suits the device type of each viewer. Hence, one invitation may be an e-mail, VoIP message, micro-blog post, or video conference request if one prospective viewer is a desktop computer, while another invitation may be a voice call, video chat, or text message if another prospective viewer is a cell phone. Upon receipt of an acceptance of an invitation, the sharer may immediately begin a one-to-many experience-sharing session or the sharer may wait for additional acceptances of invitations or for other reasons.

Alternatively, a first prospective viewer may initiate a one-to-many experience-sharing session by sending out a first invitation to a sharer and a set of other invitations to one or more other prospective viewers. The prospective sharer may then present the first invitation and, upon receiving input to accept the invitation, begin a one-to-many experience-sharing session with at least the first prospective viewer. The prospective sharer may also receive an acceptance of an invitation from the set of other invitations. As in a sharer-initiated one-to-many experience-sharing session, the invitations in a viewer-initiated one-to-many experience-sharing session may take different forms depending on the device types of the first prospective viewer and the device types of the other prospective viewers. The sharer may also present the invitation in a variety of ways, which may include: displaying of text, pictures and/or graphics; playing a voice message or audio alert; and/or invoking a physical alert (e.g. vibration). The input to accept the invitation may include audio commands received by a microphone or physical sensing from a touchpad, button, actuator, or switch. Alternatively, a sharer may allow a user to prescribe and modify settings to automatically accept or decline experience-sharing session invitations from all or selected prospective viewers.

Another exemplary technique may involve a prospective sharer or a prospective viewer initiating a one-to-many experience-sharing session while engaged in a different form of communication with the other. To elaborate, if a prospective sharer and a first viewer (or in a remote implementation: a server and a first viewer) each host a communication application, and the communication applications are compatible, a set of invitations to initiate a one-to-many experience-sharing session may be sent while the first viewer and the prospective sharer are already communicatively linked through the communication application. If the prospective sharer sends the set of invitations to the first prospective viewer and other prospective viewers, the communication application being hosted by the prospective sharer may then receive one or more acceptances of an invitation from the set of invitations and respond to the one or more acceptances of an invitation by initiating a one-to-many experience-sharing session. If the prospective viewer sends a first invitation to the prospective sharer and a set of other invitations to other prospective viewers within the communication application, the communication application being hosted by the prospective sharer may then present the first invitation, receive an acceptance of the first invitation, and respond to the acceptance of the first invitation by initiating a one-to-one experience-sharing session with the first prospective viewer. The communication application hosted by the prospective sharer may also receive at least one acceptance of an invitation from the set of other invitations.

Still another exemplary initiation technique for a one-to-many experience-sharing session may involve an existing experience-sharing session, with a session mode other than one-to-many, being modified to become a one-to-many experience-sharing session. For example, the sharer or the original viewer of an existing experience-sharing session with a session mode of one-to-one may send out a set of invitations to other prospective viewers and, in response to the sharer receiving an acceptance of at least one of the set of invitations, modifying the existing experience-sharing session by changing the session mode to one-to-many and continuing the existing experience-sharing session with the original viewer and with other viewers that have accepted one of the set of invitations. Alternatively, the sharer of the existing experience-sharing session with a session mode of one-to-one may, in response to the sharer receiving an acceptance of at least one of the set of invitations, terminate the existing experience-sharing session and begin a new one-to-many experience-sharing session with the original viewer and with other viewers that have accepted one of the set of invitations.

While a one-to-many experience-sharing session continues, the one or more viewers may change in both number and identity. Such changes may occur through a current viewer leaving the one-to-many experience-sharing session or through a prospective viewer joining the one-to-many experience-sharing session.

One exemplary technique for a current viewer to leave a one-to-many experience-sharing session may be sharer-initiated. In a sharer-initiated leaving, a sharer may stop sending the share to a selected viewer either as a result of the sharer receiving instructions from an input device to the stop sending the share to the selected viewer, or as a result of an automated reaction to existing preferences. As an example, a sharer may present a list of current viewers in a one-to-many experience-sharing session, receive a command to discontinue experience sharing with a selected set of viewers, and in response to the command continue the one-to-many experience-sharing session with only viewers not included in the selected set of viewers. Optionally, a sharer may also send a notification to the selected set of viewers to indicate a discontinuation of involvement the one-to-many experience-sharing session.

A second exemplary technique for a current viewer to leave a one-to-many experience-sharing session may be viewer-initiated. A viewer-initiated case may include the sharer receiving an indication that a certain viewer is no longer receiving the share or receiving an indication that the certain viewer no longer wishes to receive the share, and in response to the indication the sharer ceasing transmission of the share to the certain viewer. An unintentional leaving (e.g. connection lost, viewer device turns off, etc.) may also be categorized as viewer-initiated, since a response to an unintentional leaving would likely be similar to that of the viewer-initiated case.

One exemplary procedure for a viewer to join a one-to-many experience-sharing session may be prospective-viewer-initiated. The initiation process may include the sharer of a current one-to-many experience-sharing session: receiving a request from a prospective viewer to participate in the current one-to-many experience-sharing session; receiving an acceptance of the request either from an input device or from an automated process; and, responsive to the acceptance, including the prospective viewer as a viewer in the one-to-many experience-sharing session.

Another exemplary procedure for a viewer joining a one-to-many experience-sharing session may be sharer-initiated. A sharer-initiated experience-sharing session may include a sharer of an existing one-to-many experience-sharing session: sending an invitation to participate in the current one-to-many experience-sharing session to a prospective viewer, receiving an indication that the prospective viewer has accepted the invitation, and in response to the acceptance including the prospective viewer as a viewer in the current one-to-many experience-sharing session.

A third exemplary procedure for a new viewer joining a one-to-many experience-sharing session may be current-viewer-initiated. Such an initiation procedure may include an existing viewer of an current one-to-many experience-sharing session sending an invitation to participate in the current one-to-many experience-sharing session to a prospective viewer; the sharer of the current one-to-many experience-sharing session receiving an indication that the prospective viewer has accepted the invitation; the sharer presenting the indication in the form of a request to participate from the prospective viewer; the sharer receiving an acceptance of the request either from an input device or from an automated process; and, responsive to the acceptance, including the prospective viewer as a viewer in the current one-to-many experience-sharing session.

An exemplary one-to-many experience-sharing session may contain continuance procedures so that the changing characteristics of the one or more viewers may not adversely affect the one-to-many experience-sharing session. For example, a sharer may have initiated a one-to-many experience-sharing session by sending out ten invitations to ten prospective viewers, receiving four acceptances from four prospective viewers, receiving one rejection from one prospective viewer, receiving no indications from five prospective viewers, and beginning the one-to-many experience-sharing session with the four prospective viewers. Later, all of the four prospective viewers may discontinue involvement in the one-to-many experience-sharing session, leaving zero current viewers. A sharer may apply a technique to continue capturing and processing the share, despite the zero current viewers, in anticipation that the sharer may eventually receive acceptances from one or more of the five prospective viewers that were initially unresponsive. Alternatively, a sharer may apply a technique which terminates a one-to-many experience-sharing session with zero current viewers and then initiates a new one-to-many experience-sharing session if the sharer receives an acceptance of an invitation.

Throughout a one-to-many experience-sharing session, the sharer may receive indications of the number and identities of the current set of one or more viewers.

iii. Broadcast Session Mode

A sharer may also initiate an experience-sharing session a share in a broadcast mode, in which the share is broadcast to a website (such as YouTube) where it can be viewed by anyone who is able to access the website. A broadcast experience-sharing session may be initiated by user-input to the sharer, an automated process on the sharer, or transition from an existing non-broadcast experience-sharing session.

The sharer may initiate a broadcast experience-sharing session in response to received user-input. In some embodiments, the sharer may transmit instructions to the website before starting the experience-sharing session to prepare the website for receiving the share. Some procedures may also include the sharer receiving an indication that the website is prepared for the broadcast experience-sharing session before beginning the broadcast experience-sharing session with the website. Additionally, some initiation procedures may include sending notifications to one or more prospective viewers, informing the prospective viewers of the broadcast experience-sharing session. In such procedures, notifications may take many forms including, but not limited to, SMS messages, voice messages, micro-blog posts, video conference requests, voice calls, and/or other types of messages.

If an automated process initiates a broadcast experience-sharing session, an exemplary initiation process may include an application on the sharer responding to a user-defined event and in response presenting an invitation to the sharer to begin a broadcast experience-sharing session. After the sharer receives the invitation from the application, if a positive response is received from an input device, then the sharer may begin a broadcast experience-sharing session with the website. As with the sharer-initiated broadcast experience-sharing session, the sharer may transmit preparation instructions to the website, transmit notifications to prospective viewers, and/or postpone initiation until an indication of readiness is received from the website. In some embodiments, the application may transmit instructions to a website to prepare for a potential broadcast experience-sharing session at the same time that the sharer presents the invitation. In this way, the application may shorten the initiation time by parallelizing the steps of website preparation and receiving an invitation response.

Another exemplary initiation procedure for a broadcast experience-sharing session may involve a sharer modifying an existing experience-sharing session, with a session mode other than broadcast, to create a broadcast experience-sharing session. For example, the sharer of an existing one-to-many experience-sharing session may initiate a sharer-initiated broadcast experience-sharing session, send invitations to the viewers of the one-to-many experience-sharing session to join the broadcast experience-sharing session, and transmit the share to both the sharer-initiated broadcast experience-sharing session and the existing one-to-many experience-sharing session. In some procedures, the sharer may also terminate the existing one-to-many experience-sharing session either as a result of a sufficient number of viewers leaving the existing one-to-many experience-sharing session or as a result of another event (e.g. timer expiration, bandwidth restriction). In a sharer-modified initiation, the sharer may modify the existing experience-sharing session without presenting each step to the HMD, giving the impression that the existing experience-sharing session seamlessly transitioned from one session mode to the broadcast mode.

Once a broadcast experience-sharing session is initiated, the sharer may capture, process, and transmit the share to the website. Prospective viewers may then seek access to the website in order to participate in the broadcast experience-sharing session. Depending on the nature of the website and the preferences on the sharer, the sharer may receive indications about the viewers of the broadcast experience-sharing session.

In addition to general restrictions placed on users by the website, the sharer may send additional criteria to use in limiting which viewers are invited to or allowed to access a broadcast experience-sharing session. Limiting criteria may include geographic, demographic, contextual, social-network based, or other user-defined viewer data.

One deviation from general comment handling procedures in a broadcast experience-sharing session from the general comment handling procedures is that the sharer may receive the comments from the website, as opposed to directly from the viewers. Therefore, the website may rank and filter the comments from the viewers of a broadcast experience-sharing session before transmitting the comments to the sharer, allowing for minimal processing by the sharer or a server. In some embodiments, the website may also present comments from viewers either as indicated by automatic ranking procedures, by viewer ranking, or by input received from the sharer.

The website of a broadcast experience-sharing session may be any website that can receive and display a share. In practice, the website may actually represent multiple websites or web servers. Additionally, an exemplary website may not necessarily handle all portions of a share. For instance, a website configured to present video feeds but not configured to present audio feeds may receive a share consisting only of a video feed. In some embodiments, the sharer of a broadcast experience-sharing session may format the share for the specific website before transmitting the share to the website. In other embodiments, the website may format the share after receiving the share from the sharer. In still other embodiments, the sharer and the website may each format the same share before and after transmission, respectively.

Depending on how the website of a broadcast experience-sharing session is configured, the sharer may receive and display information from the website about the one or more viewers. Exemplary information about the viewers may include the number of viewers currently accessing the broadcast experience-sharing session and the identity of specific viewers. For example, one exemplary embodiment may include the sharer of a broadcast experience-sharing session displaying a number that represents a real-time number of viewers accessing the broadcast experience-sharing session. As another example, the website and sharer of a broadcast experience-sharing session may each host a social networking application in which the sharer is associated with a first user-profile. Then, if one or more of the viewers of the broadcast experience-sharing session are associated with other user-profiles of the social networking application, the website may present the identities of the one or more viewers to the sharer if the first profile is identified to be connected to the other user-profiles.

6. Conveying Communication Status

In an exemplary implementation, an ESS may be used to respond to a communication request. For example, the sharer in an ESS may be configured to receive a communication request (e.g. a phone call) and respond to the request by transmitting a real-time portion of a captured share to the device that sent the communication request. In this way, the sharer may convey the environment and activity of its user without distracting the user. In some embodiments, a server system may host a communication application and the server may receive the communication request through the application and transmit the share without actively involving the sharer in the request handling process. Although the requested communication will typically be for communication that is separate from the ESS, requests to join an ESS may also use the following exemplary procedures.

Figure 5:
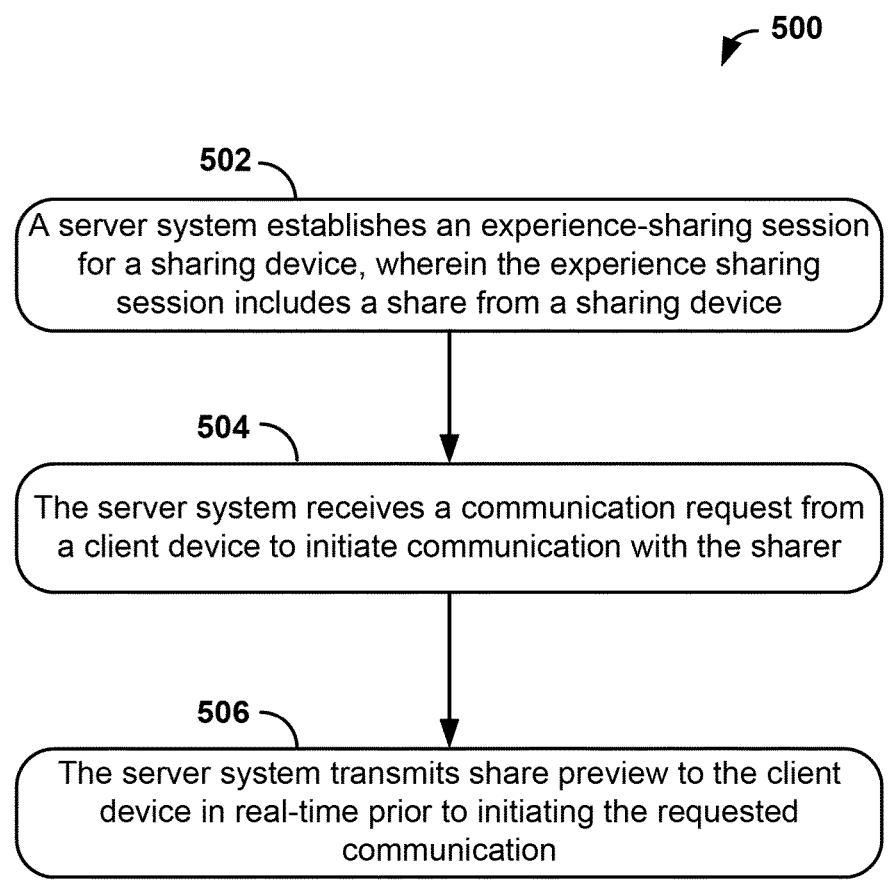
FIG. 5 is a flow chart illustrating a communication-status method, according to an exemplary embodiment.

FIG. 5 is a flow chart illustrating a communication-status method, according to an exemplary embodiment. The communication status method 500 may include a server system establishing an experience-sharing session for a sharing device, wherein the experience sharing session includes a share from a sharing device, as shown by block 502. Next, the server system may receive a communication request from a client device to initiate communication with the sharer, as shown by block 504. Then, in response to the request, the server may transmit a share preview to the client device in real-time, as shown by block 506.

The requested communication may be in a form involving audio communication (e.g., a voice call), video communication (e.g., video conferencing), and/or text/graphic-based communication (e.g., instant messaging or email). A request to join an ESS may also be an exemplary communication request. If the sharer hosts several communication applications, the sharer may use different communication status procedures for each of the several communication applications. The form of the requested communication may also influence the specific steps used to handle the communication request.

The share preview sent in response to a communication request may take many forms (e.g., a real-time audio feed, a real-time video feed, and/or one or more still pictures) and the form of the requested communication may influence the form of the response share. For example, a request to engage in a voice call may prompt a brief audio feed captured by the sharer to be transmitted in real-time to the viewer as a preview share. As another example, a preview share sent through an instant messaging application that supports both text and picture communication may include a still picture captured by the sharer and a pre-defined caption. As a third example, a preview share responding to an invitation to engage in a video conference may consist of a video feed accompanied by an audio feed; each feed being captured and transmitted in real time to the video conferencing application on the viewer.

In some exemplary embodiments, the share preview may comprise a lower-resolution version of the share, termed a thumbnail. This thumbnail may be the entirety of the full-resolution share or it may be a version of the share that has been reduced in resolution, either temporally or spatially, to conserve processing and transmission resources.

In some cases, a share preview may further include augmentations to the captured feed. For example, a user may specify that outgoing share previews include a caption (for instance, "I'm doing this. Do you really need to talk?") A share preview comprising a continuous feed may include a relatively short segment of the continuous feed so that the communication status may be depicted without overusing system resources.

In some embodiments, the sharer may present an indication of the communication request or allow the communication application to present the communication request to a user. Indication of a request may include visual display (e.g. text, pictures, graphics, or video), audio presentation, or physical notification (e.g. vibration). Additionally, a presentation may include control options, such as selection buttons, to allow the sharer to receive instructions on how to handle the communication request. The sharer may present the communication request before, after, or at the same time as the sharer transmits a response share, depending on preferences defined on either the sharer or the communication application.

Figure 6A:
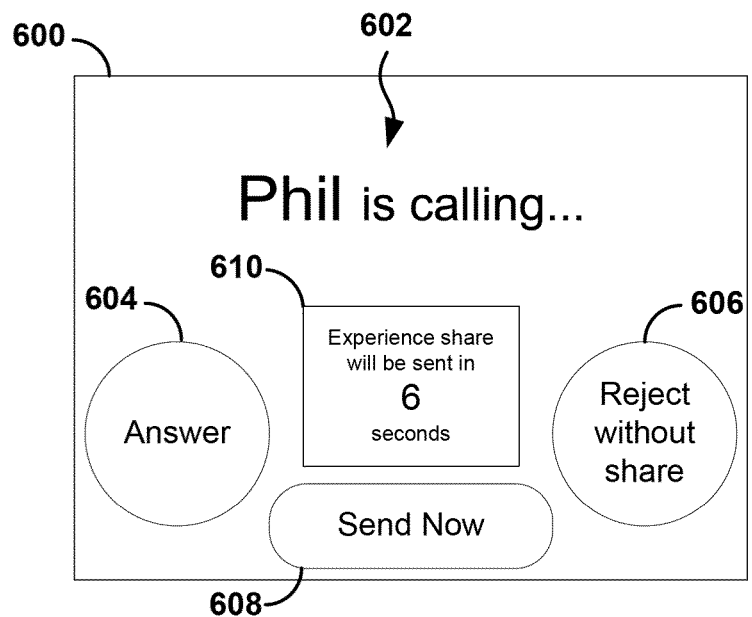
FIG. 6A shows an example sharing device user-interface.

An embodiment that presents an indication of a request before or at the same time as transmitting a share preview may allow a user to select whether the share preview is sent. Selection procedures may include an action by the user (such as, pressing a button, interacting with a touchpad, speaking a voice command, etc.) or a lack of action (i.e., a time limit for selection expires). FIG. 6A shows an exemplary user-interface for such an embodiment. As shown, the user-interface 600 contains an indication of the communication request 602 along with control buttons 604, 606, and 608. In the example illustrated in FIG. 6A, command button 604 may allow a user to avoid transmitting a share preview by simply accepting the request and control button 606 may allow a user to avoid sending a share preview by simply rejecting the request. In this example, two options are shown for sending a share: the user may select control button 608 to immediately transmit a share or the user may allow time limit to pass without selecting any control button. As indicated by text box 610, the time limit in this example will expire in 6 seconds at which point the system may automatically transmit a share. Many other user-interface designs and control options may be used.

Exemplary procedures, in which an indication of the communication request is presented after sending a response share or not at all, may include automatic sharing procedures. For example, preferences set on the sharer may turn on the automatic handling of communication requests. Then, a status indication message may be sent to the server specifying how the server should handle requests. Once the server receives the status indication message specifying handing procedures, the server may automatically transmit share previews and/or present communication requests to the sharer in accordance with the specified handling procedures. Embodiments in which the sharer handles communication requests without using a remote server may involve the sharer automatically handling communication requests based on the preferences, without alerting a user.

Some embodiments may include receiving a confirmation from the viewer before presenting the communication request on the sharer. For example, in response to a first communication request, a server may automatically send a share preview to the viewer, including options to either confirm or not confirm the communication. As an alternative example, in response to a sharer presenting the first communication request and receiving instructions to send a response share with the option of a second communication request, the sharer may send a response share to the viewer, including with the response share options to either send or not send a second communication request. In response to receiving a second communication request the sharer may present the second communication request. Additionally, the option for a second communication request may be subject to a time limit.

Figure 6B:
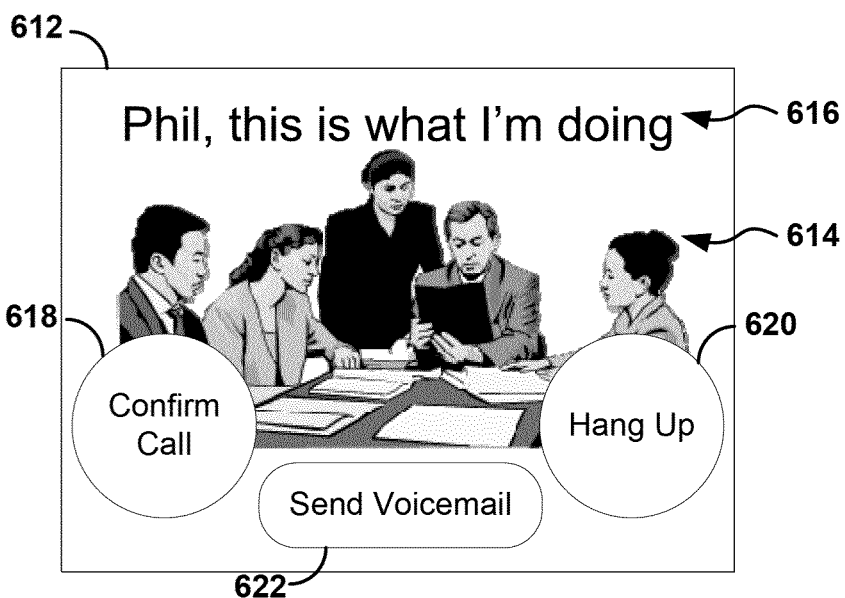
FIG. 6B shows an example viewing device user-interface.

FIG. 6B shows an exemplary user-interface that may be presented on a client device requesting communication with a sharer that is in a business meeting. The user-interface 612 shows a share preview 614 taken from the video feed of the sharer. Additionally, this example share preview has been augmented with a text banner 616 containing a personal greeting to the user of the client device. In this example, command button 618 may allow a user to confirm that they still desire to submit a communication request to the sharer device. Control button 620 may allow the user to withdraw their communication request. This exemplary user-interface also contains command button 622, which may allow a user to leave a message for the user of the sharer. Many other user-interface designs and control options may be available.

After presenting a communication request on the sharing device, the sharer may receive instructions to either accept or deny a communication request. In response to receiving instructions to accept the communication request, the sharer may allow the communication application to begin communication between the sharer and the viewer. As before, a sharer may send a response share to the viewer if the instructions to deny a communication request also include instructions to send a response share to the viewer.

As an example status, a sharer may be set to a "busy" status, in which the server automatically sends a share preview in response to any received communication request from a client device. In this case, the server may also initially refrain from presenting the communication request to the sharer. Although the communication request is not presented to the sharer, a message from the server may request the status of the sharer and the sharer may automatically report the current user-preferences, without disturbing the user. After the server has transmitted the share preview, it may receive a confirmation of the requested communication from the client device. In response, the server may now present the communication request to the sharer.

As another example, a sharer may be set to a "do not disturb" status in which the server transmits a share preview to any client device that requests communication, but rejects the communication. In this case, a confirmation from the client device may not be allowed and the sharer would not present the communication request in any case.

Some exemplary statuses may specify procedures for dealing with particular client devices or modes of communication. For example, a sharer may send out a status indication message indicating that the sharer is set to a "do not video chat" mode. In this mode the server may automatically reject video chat requests with or without sending a share preview, but transmit a share preview and present requests from client devices for all other modes of communication. As another example, a sharer may be set to an "on vacation from work" setting, in which communication requests are handled normally unless the request is received from a client device that is listed as a "work" contact in the sharer's contact list. For instance, the server may be configured to send a share preview to work colleagues, before forwarding such client devices to a voice mail service.

As a further example, if a client device requests to join an ESS for which the client device is not authorized, the server may automatically send a share preview and reject the joining. For example, if a particular ESS is only available to members of a particular business committee, the sharer may be set to send out a share preview to prospective viewers that are not connected with the business, so that they can see why they are not allowed to join the ESS.

Some exemplary procedures may only send a status indication message when a sharing device changes status. In such an embodiment, the server may then store the status of the sharing device and automatically handle communication requests without needing to receive a status message for each communication request. Many other preferences and statuses may be defined on a sharer and server to control how and when experience sharing may be used in a communication status application.

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method, comprising:
    establishing, by a server system, an experience-sharing session, wherein the experience-sharing session comprises a share generated by a sharing device and received at the server system, wherein the sharing device comprises a head-mountable camera, wherein the share comprises a real-time video feed based on video captured by the head-mountable camera, and wherein the real-time video feed captures a wearer-experience associated with the sharing device;
    receiving, by the server system, a status indication message, wherein the status indication message associates a busy status with the sharing device;
    in response to receiving the status indication message, associating, by the server system, the busy status with the sharing device;
    receiving, by the server system, a communication request, wherein the communication request is a request for the sharing device to accept a communication with a client device, wherein the communication request is received at a time when the busy status is associated with the sharing device, and wherein the communication request is initiated by the client device; and
    in response to receiving the communication request at the time when the busy status is associated with the sharing device, the server system: (i) refraining from relaying the communication request to the sharing device, and (ii) transmitting a share preview to the client device, wherein the share preview comprises at least a portion of the share, and wherein the portion of the share comprises at least a portion of the real-time video feed.

2. The method of claim 1, wherein the received communication request comprises a request to engage in an audio communication, wherein the audio communication is not part of the experience sharing session.

3. The method of claim 1, wherein the requested communication comprises a video communication.

4. The method of claim 1, wherein the requested communication comprises a text communication.

5. The method of claim 1, wherein the real-time video stream comprises a low-frame-rate video, and wherein the low-frame-rate video is transmitted in real-time.

6. The method of claim 1, wherein the share preview comprises a still image from the share.

7. The method of claim 1, wherein the share further comprises real-time audio, and wherein the share preview comprises a portion of the real-time audio.

8. The method of claim 1, further comprising:
    after transmitting the share preview to the client device, the server system receiving from the client device a confirmation of the requested communication.

9. The method of claim 8, further comprising:
    in response to receiving the confirmation of the requested communication, the server system transmitting an indication of the requested communication to the sharing device.

10. The method of claim 1, further comprising:
    the server system transmitting an indication of the requested communication to the sharing device; and
    the server system receiving an indication that the requested communication is not accepted.

11. The method of claim 10, wherein the server system transmits the share preview to the client device in response to receipt of the indication that the requested communication is not accepted.

12. A sharing device, comprising:
    a head-mountable camera;
    a non-transitory computer-readable medium;
    program instructions stored on the non-transitory computer-readable medium and executable by at least one processor to:
        (i) establish an experience-sharing session, wherein the experience-sharing session comprises a share generated by the sharing device, wherein the share comprises a real-time video feed of video based on video captured by the head-mountable camera, and wherein the real-time video feed captures a wearer-experience associated with the sharing device;
        (ii) associate a busy status with the sharing device;
        (iii) receive a communication request that was sent by a client device, wherein the communication request is a request for the sharing device to accept a communication with a client device, and wherein the communication request is received at a time when the busy status is associated with the sharing device; and
        (iii) in response to receipt of the communication request at the time when the busy status is associated with the sharing device: (i) automatically refrain from acceptance of the communication request, and (ii) transmit a share preview to the client device, wherein the share preview comprises at least a portion of the share, and wherein the portion of the share comprises at least a portion of the real-time video feed.

13. The sharing device of claim 12, further comprising one or more microphones, and wherein the captured share comprises real-time audio captured on the one or more microphones.

14. The sharing device of claim 12, wherein the program instructions are further executable by the at least one processor to:
- after transmitting the share preview, receive a confirmation of the requested communication from the client device; and
- in response to receiving the confirmation, presenting an indication of the requested communication to the sharing device.

15. A method, comprising:
- establishing, by a sharing device, an experience-sharing session, wherein the experience-sharing session comprises a share from the sharing device, wherein the sharing device comprises a head-mountable camera, wherein the share comprises a real-time video feed of video captured by the head-mountable camera, and wherein the real-time video feed captures a wearer-experience associated with the sharing device;
- associating a busy status with the sharing device;
- receiving, by the sharing device, a communication request that was sent from a client device, wherein the communication request is a request to accept a communication with the client device, and wherein the communication request is received at a time when the busy status is associated with the sharing device; and
- in response to receiving the communication request at the time when the busy status is associated with the sharing device, the sharing device: (i) refraining from acceptance of the communication request, and (ii) transmitting a share preview to the client device, wherein the share preview comprises at least a portion of the share, and wherein the portion of the share comprises at least a portion of the real-time video feed.

16. The method of claim 15, further comprising:
- after transmitting the share preview, receive a confirmation of the requested communication from the client device; and
- in response to receiving the confirmation, presenting an indication of the requested communication to the sharing device.

17. The method of claim 15, further comprising the sharing device receiving real-time audio, wherein the share preview further comprises a portion of the real-time audio.

* * * * *